(12) United States Patent
Zhang et al.

(10) Patent No.: US 11,615,292 B2
(45) Date of Patent: Mar. 28, 2023

(54) PROJECTING IMAGES TO A GENERATIVE MODEL BASED ON GRADIENT-FREE LATENT VECTOR DETERMINATION

(71) Applicant: Adobe Inc., San Jose, CA (US)

(72) Inventors: Richard Zhang, San Francisco, CA (US); Sylvain Philippe Paris, Jamaica Plain, MA (US); Junyan Zhu, Cambridge, MA (US); Aaron Phillip Hertzmann, San Francisco, CA (US); Jacob Minyoung Huh, La Crescenta, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/899,936

(22) Filed: Aug. 31, 2022

(65) Prior Publication Data

US 2022/0414431 A1  Dec. 29, 2022

Related U.S. Application Data

(62) Division of application No. 16/798,271, filed on Feb. 21, 2020, now Pat. No. 11,468,294.

(51) Int. Cl.
   *G06N 3/04* (2006.01)
   *G06T 11/60* (2006.01)
   *G06F 17/18* (2006.01)

(52) U.S. Cl.
   CPC .......... *G06N 3/0454* (2013.01); *G06F 17/18* (2013.01); *G06N 3/0472* (2013.01); *G06T 11/60* (2013.01)

(58) Field of Classification Search
   CPC ...... G06N 3/0454; G06N 3/0472; G06N 3/08; G06N 3/084; G06N 3/04; G06N 20/10; G06N 3/0445; G06N 3/0481; G06N 3/063; G06N 20/00; G06F 17/18; G06F 16/9024; G06F 16/55; G06F 16/65; G06F 17/16;
   (Continued)

(56) References Cited

U.S. PATENT DOCUMENTS 10,121,104 B1  11/2018  Hu
11,301,723 B2   4/2022  Nitta
(Continued)

OTHER PUBLICATIONS

"Restriction Requirement", U.S. Appl. No. 16/798,271, dated Mar. 11, 2022, 7 pages.
(Continued)

*Primary Examiner* — Michael S Osinski
(74) *Attorney, Agent, or Firm* — FIG. 1 Patents

(57) ABSTRACT

A target image is projected into a latent space of generative model by determining a latent vector by applying a gradient-free technique and a class vector by applying a gradient-based technique. An image is generated from the latent and class vectors, and a loss function is used to determine a loss between the target image and the generated image. This determining of the latent vector and the class vector, generating an image, and using the loss function is repeated until a loss condition is satisfied. In response to the loss condition being satisfied, the latent and class vectors that resulted in the loss condition being satisfied are identified as the final latent and class vectors, respectively. The final latent and class vectors are provided to the generative model and multiple weights of the generative model are adjusted to fine-tune the generative model.

20 Claims, 7 Drawing Sheets

(58) Field of Classification Search
CPC .................. G06F 40/30; G06T 11/60; G06T 2207/20081; G06T 2207/20084; G06T 2207/20076; G06T 7/174; G06K 9/6215; G06K 9/6232; G06K 9/6256; G06K 9/6257; G06K 9/6267; G06K 9/6271; G06V 10/82; G06V 10/454

See application file for complete search history.

(56) References Cited

U.S. PATENT DOCUMENTS

| | | | |
|---|---|---|---|
| 11,341,371 | B2 | 5/2022 | Wang et al. |
| 11,468,294 | B2 | 10/2022 | Zhang et al. |
| 11,520,413 | B2* | 12/2022 | Yu ..................... G06F 3/04886 |
| 11,521,072 | B2* | 12/2022 | Revaud .................. G06F 17/18 |
| 2013/0138436 | A1 | 5/2013 | Yu |
| 2014/0010410 | A1 | 1/2014 | Sakurai |
| 2016/0026914 | A1 | 1/2016 | Yu et al. |
| 2017/0116498 | A1 | 4/2017 | Raveane et al. |
| 2018/0025271 | A1 | 1/2018 | Sawada et al. |
| 2019/0171707 | A1 | 6/2019 | Rapaport |
| 2020/0050965 | A1 | 2/2020 | Harvill et al. |
| 2020/0104641 | A1 | 4/2020 | Alvelda, VII |
| 2020/0130177 | A1 | 4/2020 | Kolouri et al. |
| 2020/0250497 | A1 | 8/2020 | Peng et al. |
| 2020/0342328 | A1 | 10/2020 | Revaud et al. |
| 2020/0394506 | A1 | 12/2020 | Louizos et al. |
| 2021/0012200 | A1 | 1/2021 | Lyske |
| 2021/0224573 | A1 | 7/2021 | Bousmalis et al. |
| 2021/0326707 | A1 | 10/2021 | Lyske et al. |
| 2022/0005376 | A1 | 1/2022 | Pichara et al. |
| 2022/0067533 | A1 | 3/2022 | Jiao et al. |
| 2022/0121934 | A1 | 4/2022 | Duan et al. |
| 2022/0148191 | A1 | 5/2022 | Liu et al. |
| 2022/0309341 | A1* | 9/2022 | Brox .................... G06N 3/0481 |

OTHER PUBLICATIONS

U.S. Appl. No. 16/798,271, "Notice of Allowance", U.S. Appl. No. 16/798,271, dated Jun. 3, 2022, 11 pages.
Abdal, Rameen et al., "Image2StyleGAN: How to Embed Images Into the StyleGAN Latent Space?", 2019 IEEE/CVF International Conference on Computer Vision (ICCV) [retrieved Oct. 5, 2022]. Retrieved from the Internet <https://arxiv.org/pdf/1904.03189.pdf>., Sep. 3, 2019, 23 pages.
Asim, Muhammad et al., "Blind Image Deconvolution using Deep Generative Priors", Cornell University arXiv, arXiv.org [retrieved Jan. 24, 2022]. Retrieved from the Internet <http://arxiv-export-lb.library.cornell.edu/pdf/1802.04073>., Feb. 26, 2019, 20 pages.
Barnes, Connelly et al., "PatchMatch: A Randomized Correspondence Algorithm for Structural Image Editing", ACM SIGGRAPH 2009 Papers (New Orleans, Louisiana, Aug. 3-7, 2009) [retrieved Sep. 7, 2022]. Retrieved from the Internet <https://faculty.idc.ac.il/arik/seminar2009/papers/patchMatch.pdf>., Aug. 3, 2009, 10 pages.
Bau, David et al., "GAN Dissection: Visualizing and Understanding Generative Adversarial Networks", Cornell University arXiv, arXiv.org [retrieved Jan. 24, 2022]. Retrieved from the Internet <https://arxiv.org/pdf/1811.10597.pdf>., Dec. 8, 2018, 18 pages.
Bau, David et al., "Seeing What a GAN Cannot Generate", 2019 IEEE/CVF International Conference on Computer Vision (ICCV) [retrieved Jan. 24, 2022]. Retrieved from the Internet <http://bzhou.ie.cuhk.edu.hk/publication/iccv19_see_gan.pdf>., Oct. 24, 2019, 10 pages.
Bau, David et al., "Semantic Photo Manipulation with a Generative Image Prior", Cornell University arXiv, arXiv.org [retrieved Jan. 31, 2022]. Retrieved from the Internet <https://arxiv.org/pdf/2005.07727.pdf>., Sep. 12, 2020, 11 pages.
Brock, Andrew et al., "Large Scale Gan Training for High Fidelity Natural Image Synthesis", Cornell University arXiv, arXiv.org [retrieved Sep. 7, 2022]. Retrieved from the Internet <https://arxiv.org/pdf/1809.11096.pdf>., Feb. 25, 2019, 35 pages.

Brock, Andrew et al., "Neural Photo Editing with Introspective Adversarial Networks", Cornell University arXiv, arXiv.org [retrieved Jan. 21, 2022]. Retrieved from the Internet <https://arxiv.org/pdf/1609.07093.pdf>., Feb. 6, 2017, 15 pages.
Byrd, Richard H. et al., "A limited memory algorithm for bound constrained optimization", May 1994, 25 pages.
Deng, Jia et al., "ImageNet: A Large-Scale Hierarchical Image Database", In Proceedings of IEEE Conference on Computer Vision and Pattern Recognition [retrieved Nov. 16, 2022]. Retrieved from the Internet <https://www-cs-faculty.stanford.edu/groups/vision/documents/ImageNet_CVPR2009.pdf>., Jun. 20, 2009, 8 pages.
Donahue, Jeff et al., "Adversarial Feature Learning", Apr. 3, 2017, 18 pages.
Donahue, Jeff et al., "Large Scale Adversarial Representation Learning", Nov. 5, 2019, 32 pages.
Dosovitskiy, Alexey et al., "Generating Images with Perceptual Similarity Metrics based on Deep Networks", Feb. 9, 2016, 14 pages.
Dosovitskiy, Alexey et al., "Inverting Visual Representations with Convolutional Networks", Apr. 26, 2016, 15 pages.
Dumoulin, Vincent et al., "Adversarially Learned Inference", Feb. 21, 2017, 18 pages.
Efros, et al., "Texture Synthesis by Non-parametric Sampling", IEEE International Conference on Computer Vision [retrieved Sep. 7, 2022]. Retrieved from the Internet <https://citeseerx.ist.psu.edu/viewdoc/download?doi=10.1.1.44.14&rep=rep1&type=pdf>., Sep. 1999, 6 pages.
Efros, Alexei A. et al., "Image Quilting for Texture Synthesis and Transfer", SIGGRAPH 2001, Computer Graphics Proceedings, ACM Press/ACM SIGGRAPH [retrieved Oct. 5, 2022]. Retrieved from the Internet <https://citeseerx.ist.psu.edu/viewdoc/download?doi=10.1.1.10.9655&rep=rep1&type=pdf>., Aug. 2001, 6 pages.
Everingham, Mark et al., "The PASCAL Visual Object Classes (VOC) Challenge: A Retrospective", Jan. 1, 2015, 38 pages.
Gatys, Leon A. et al., "Image Style Transfer Using Convolutional Neural Networks", In Proc. CVPR, 2016. [retrieved Oct. 5, 2022]. Retrieved from the Internet <https://rn-unison.github.io/articulos/style_transfer.pdf>., Jun. 2016, 10 Pages.
Goodfellow, Ian J. et al., "Generative Adversarial Nets", In: Advances in neural information processing systems (2014) [retrieved Nov. 16, 2022]. Retrieved from the Internet <https://www.cs.utah.edu/~zhe/teach/archived/2019f/6190-pdf/gans.pdf>., Jun. 10, 2014, 9 pages.
Hansen, Nikolaus et al., "Completely Derandomized Self-Adaptation in Evolution Strategies", Jun. 1, 2001, 39 pages.
Hansen, Nikolaus, "The CMA Evolution Strategy: A Comparing Review", CoLab Computational Laboratory [retrieved Oct. 5, 2022]. Retrieved from the Internet <http://www.cmap.polytechnique.fr/~nikolaus.hansen/hansenedacomparing.pdf>., Jun. 2007, 28 pages.
He, Kaiming et al., "Mask R-CNN", Cornell University arXiv, arXiv.org [retrieved Jan. 26, 2022]. Retrieved from the Internet <https://arxiv.org/pdf/1703.06870.pdf>., Jan. 24, 2018, 12 pages.
Hertzmann, Aaron et al., "Image Analogies", Proceedings of SIGGRAPH 2001 [retrieved Oct. 5, 2022]. Retrieved from the Internet <https://legacy.sites.fas.harvard.edu/~cs278/papers/analogies.pdf>., Aug. 2001, 14 pages.
Huang, Xun et al., "Multimodal Unsupervised Image-to-Image Translation", Aug. 14, 2018, 23 pages.
Isola, Phillip et al., "Image-to-Image Translation with Conditional Adversarial Networks", 2017 IEEE Conference on Computer Vision and Pattern Recognition (CVPR) [retrieved Nov. 20, 2022]. Retrieved from the Internet <https://gangw.web.illinois.edu/class/cs598/papers/CVPR17-img2img.pdf>., Nov. 22, 2017, 17 pages.
Jahanian, Ali et al., "On the "steerability" of generative adversarial networks", Cornell University arXiv, arXiv.org [retrieved Jan. 27, 2022], Retrieved from the Internet <https://arxiv.org/pdf/1907.07171.pdf>., Feb. 17, 2020, 31 Pages.
Johnson, Justin et al., "Perceptual Losses for Real-Time Style Transfer and Super-Resolution.", Cornell University arXiv, arXiv.org [retrieved Nov. 20, 2022]. Retrieved from the Internet <https://arxiv.org/pdf/1603.08155.pdf>., Mar. 27, 2016, 18 pages.
Karras, Tero et al., "A Style-Based Generator Architecture for Generative Adversarial Networks", Cornell University arXiv, arXiv.

(56) References Cited

OTHER PUBLICATIONS org [retrieved Oct. 5, 2022]. Retrieved from the Internet <https://arxiv.org/pdf/1812.04948.pdf>., Mar. 29, 2019, 12 pages.
Karras, Tero et al., "Progressive Growing of GANs fro Improved Quality, Stability, and Variation", Feb. 26, 2018, 26 pages.
Kingma, Diederik P., "Adam: A Method for Stochastic Optimiziation", Dec. 22, 2014, 9 pages.
Kirkpatrick, James et al., "Overcoming catastrophic forgetting in neural networks", Jan. 25, 2017, 13 pages.
Krizhevsky, Alex et al., "Learning Multiple Layers of Features from Tiny Images", Apr. 8, 2009, 60 pages.
Larsen, Anders B. et al., "Autoencoding beyond pixels using a learned similarity metric", Cornell University arXiv, arXiv.org [retrieved Jan. 25, 2022]. Retrieved from the Internet <https://arxiv.org/pdf/1512.09300.pdf>., Feb. 10, 2016, 8 pages.
Levin, Anat et al., "A Closed-Form Solution to Natural Image Matting", IEEE Transactions on Pattern Analysis and Machine Intelligence, vol. 30, No. 2 [retrieved Feb. 14, 2022]. Retrieved from the Internet <https://www.cs.jhu.edu/~misha/ReadingSeminar/Papers/Levin06.pdf>., Feb. 2008, 15 pages.
Lipton, Zachary C. et al., "Precise Recovery of Latent Vectors from Generative Adversarial Networks", Cornell University arXiv, arXiv.org [retrieved Jan. 25, 2022]. Retrieved from the Internet <https://arxiv.org/pdf/1702.04782.pdf>., Feb. 17, 2017, 4 pages.
Liu, Dong C. et al., "On the Limited Memory BFGS Method for Large Optimization", Aug. 1989, 27 pages.
Liu, Ming-Yu et al., "Unsupervised Image-to-Image Translation Networks", Jul. 23, 2018, 11 pages.
Mahendran, Aravindh et al., "Understanding Deep Image Representations by Inverting Them", Nov. 26, 2014, 9 pages.
Mirza, Mehdi et al., "Conditional Generative Adversarial Nets", Nov. 6, 2014, 7 pages.
Miyato, Takeru et al., "cGANs with Projection Discriminator", Cornell University arXiv, arXiv.org [retrieved Sep. 7, 2022], Retrieved from the Internet <https://arxiv.org/pdf/1802.05637.pdf>., Aug. 15, 2018, 21 pages.
Odena, Augustus et al., "Conditional Image Synthesis with Auxiliary Classifier GANs", Jul. 20, 2017, 12 pages.
Olah, Chris et al., "Feature Visualization", Retrieved at: https://distill.pub/2017/feature-visualization/ - on Dec. 10, 2019, Nov. 7, 2017, 9 pages.
Olah, Chris et al., "The building blocks of interpretability", Retrieved at: https://distill.pub/2018/building-blocks/?utm_campaign=Revue%20newsletter&utm_medium=Newsletter&utm_source=Deep%20Learning%20Weekly, Mar. 6, 2018, 7 pages.
Perarnau, Guim et al., "Invertible Conditional GANs for image editing", Cornell University arXiv, arXiv.org [retrieved Jan. 25, 2022]. Retrieved from the Internet <https://arxiv.org/pdf/1611.06355.pdf>., Nov. 19, 2016, 9 pages.
Perez, et al., "Poisson Image Editing", ACM Trans. Graph., vol. 22, Jul. 2003, pp. 313-318.
Radford, Alec et al., "Unsupervised Representation Learning with Deep Convolutional Generative Adversarial Networks", ICLR 2016, Jan. 7, 2016, 16 pages.
Reed, Scott et al., "Generative Adversarial Text to Image Synthesis", Jun. 5, 2016, 10 pages.
Wampler, Kevin et al., "Optimal Gait and Form for Animal Locomotion", Jun. 27, 2009, 8 pages.
Wang, Zhou et al., "Image Quality Assessment: From Error Visibility to Structural Similarity", IEEE Transactions on Image Processing, vol. 13, No. 4 [retrieved Sep. 6, 2022]. Retrieved from the Internet <http://www.cns.nyu.edu/pub/lcv/wang03-preprint.pdf>., Apr. 2004, 14 pages.
Xie, Saining et al., "Aggregated Residual Transformations for Deep Neural Networks", Apr. 11, 2017, 10 pages.
Xu, Tao et al., "AttnGAN: Fine-Grained Text to Image Generation with Attentional Generative Adversarial Networks", Nov. 28, 2017, 9 pages.
Yeh, Raymond A. et al., "Semantic Image Inpainting with Deep Generative Models", Cornell University arXiv, arXiv.org [retrieved Jan. 25, 2022]. Retrieved from the Internet <https://arxiv.org/pdf/1607.07539.pdf>., Jul. 13, 2017, 19 pages.
Yu, Fisher et al., "LSUN: Construction of a Large-Scale Image Dataset using Deep Learning with Humans in the Loop", Cornell University arXiv, arXiv.org [retrieved Jan. 26, 2022]. Retrieved from the Internet <https://arxiv.org/pdf/1506.03365.pdf>., Jun. 4, 2016, 9 pages.
Zhang, Han, "StackGan++: Realistic Image Synthesis with Stacked Generative Adversarial Networks", Oct. 19, 2017, 15 pages.
Zhang, Richard et al., "The Unreasonable Effectiveness of Deep Features as a Perceptual Metric", Cornell University arXiv, arXiv.org [retrieved Oct. 9, 2022]. Retrieved from the Internet <https://arxiv.org/pdf/1801.03924.pdf>., Apr. 10, 2018, 14 Pages.
Zhu, Jun-Yan et al., "Generative Visual Manipulation on the Natural Image Manifold", University of California, Berkeley, 2018, [retrieved on Jan. 21, 2022], Retrieved from the Internet: <URL:https://arxiv.org/pdf/1609.03552.pdf>., Dec. 16, 2018, 16 pages.
Zhu, Jun-Yan et al., "Unpaired Image-to-Image Translation using Cycle-Consistent Adversarial Networks", 2017 IEEE International Conference on Computer Vision (ICCV) [retrieved Oct. 9, 2022]. Retrieved from the Internet <https://eva.fing.edu.uy/pluginfile.php/320560/mod_resource/content/1/Zhu_Unpaired_Image-To-Image_Translation_ICCV_2017_paper.pdf>., Nov. 15, 2018, 10 pages.

\* cited by examiner

300

302 y location x location

304 y location x location

PROJECTING IMAGES TO A GENERATIVE MODEL BASED ON GRADIENT-FREE LATENT VECTOR DETERMINATION

RELATED APPLICATIONS

This application is a divisional of U.S. patent application Ser. No. 16/798,271, filed Feb. 21, 2020, entitled "Projecting Images To A Generative Model Based On Gradient-free Latent Vector Determination," the disclosure of which is hereby incorporated by reference herein in its entirety.

BACKGROUND

As computer technology has advanced, a wide range of uses and applications of computers have evolved. One recent advancement is generative models, such as generative adversarial networks (GANs), which can generate images from initial inputs that are typically random, referred to as latent vectors. These generative models can be provided as part of various digital content creation applications and provide many benefits, such as generation of images that can be difficult to distinguish from images captured by a camera.

Some generative models allow a user to control various aspects of the images being generated by varying the latent vector input to the generative model. Accordingly, these generative models are only able to control aspects of the images being generated by the model, not other images input to the model. Although some attempts have been made to project an image into the latent space of a generative model, such attempts provide poor results, leaving a user with little or no ability to control aspects of other images input to the generative model.

Conventional solutions thus provide little or no ability to input an image into a generative network, resulting in user dissatisfaction and frustration with their computers and image generation systems.

SUMMARY

To mitigate the drawbacks of conventional image generation systems, projecting images to a generative model based on gradient-free latent vector determination is described. A target image is received and projected into a latent space of a generative model having multiple weights. The projection is performed by determining a latent vector by applying a previously determined loss between the target image and a previously generated image to a gradient-free technique, determining a class vector by applying by applying the previously determined loss to a gradient-based technique, generating, from the latent vector and the class vector, a new generated image, and determining a loss between the target image and the new generated image. This determining of the latent vector, determining of the class vector, generating of the new image, and determining the loss is repeated until a loss condition is satisfied. In response to the loss condition being satisfied, the latent vector that resulted in the loss condition being satisfied is identified as a final latent vector and the class vector that resulted in the loss condition being satisfied is identified as a final class vector. The final latent vector and the final class vector are provided to the generative model and the multiple weights of the generative model are adjusted to reduce the loss between the target image and a final image generated by the generative model from the final latent vector and the final class vector.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
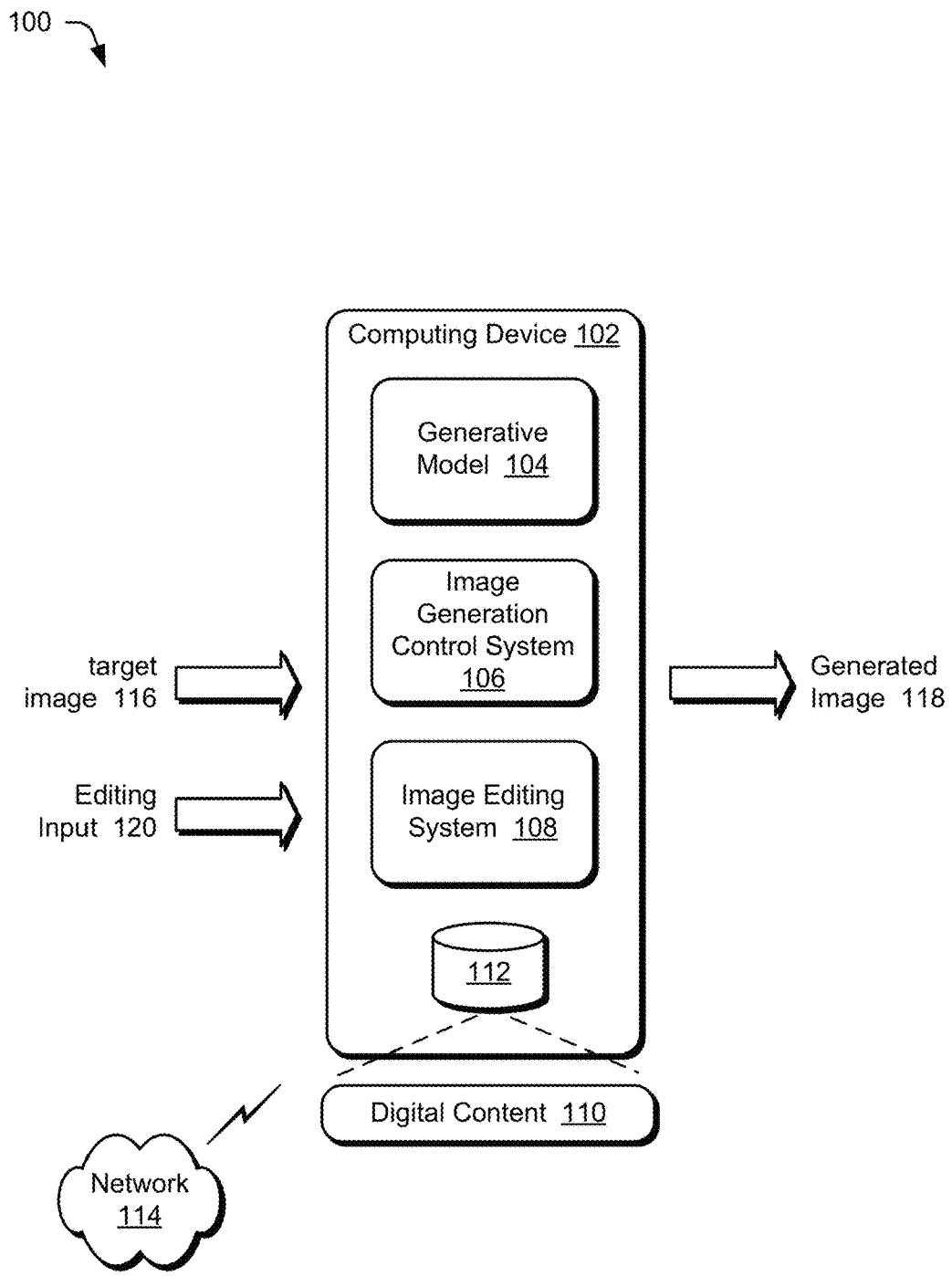
FIG. 1 is an illustration of a digital medium environment in an example implementation that is operable to employ the projecting images to a generative model based on gradient-free latent vector determination described herein.

Current attempts to project a target image into the latent space of a generative model produce poor results. Although such attempts generate latent and class vectors from which the generative model generates an image, the generated image is not a close approximation to the target image.

To overcome these problems, projecting images to a generative model based on gradient-free latent vector determination is discussed herein. Generally, a target image is received and projected into a latent space of a generative model having multiple weights. The projecting includes determining a latent vector by applying a gradient-free technique and determining a class vector by applying a gradient-based technique. An image is generated from the latent vector and the class vector, and a loss function is used to determine a loss between the target image and the generated image. This determining of the latent vector and the class vector, generating an image, and determining the loss is repeated until a loss condition is satisfied. In response to the loss condition being satisfied, the latent vector that resulted in the loss condition being satisfied is identified as a final latent vector and the class vector that resulted in the loss condition being satisfied is identified as a final class vector. The final latent and class vectors are provided to the generative model and the multiple weights of the generative model are adjusted to fine-tune the generative model so as to reduce the loss between the target image and a final image generated by the generative model from the final latent vector and the final class vector.

An image generation control system receives a target image and generates initial latent and class vectors, such as randomly or pseudorandomly. The initial latent and class vectors are input to the generative model (e.g., a generator network of a generative adversarial network (GAN)), which generates a generated image from the initial latent and class vectors. A loss function is used to compare the target image to the generated image from the generative model, and the initial latent and class vectors are modified based on the differences between the target image and the generated image from the generative model. The modified latent and class vectors are input to the generative model and this process is repeated through multiple iterations until the loss function indicates a loss condition has been satisfied (e.g., until the loss between the target image and the generated image is less than a threshold amount, has been minimized, etc.).

The image generation control system uses a combination of gradient-free and gradient-based techniques to find a latent vector and class vector that result in a generated image that is an approximate match to the target image (also referred to as inverting the generative model). Gradient-based techniques rely on gradients whereas gradient-free techniques do not rely on gradients. Gradient-based techniques take advantage of gradient information that can allow them to find an approximate match quicker than gradient-free techniques, but gradient-based techniques oftentimes identify local minimums rather than global minimums so identify a closest approximate match to the target image less accurately than the gradient-free techniques. By using a combination of gradient-free and gradient-based techniques, the projection module leverages the faster performance of the gradient-based techniques as well as the more accurate performance of the gradient-free techniques. In one or more implementations, a gradient-free technique is used to find the latent vector and a gradient-based technique is used to find the class vector.

The image generation control system can use various different loss functions to determine the loss between the target image and a generated image. In one or more implementations, the loss function includes a reconstruction loss between the images and a perceptual loss that models the perceptual closeness of the images perceived by humans. The perceptual loss is weighted to control how heavily the perceptual loss is factored into the loss function relative to the reconstruction loss.

Additionally or alternatively, the loss function includes an image mask component. The image generation control system generates an image mask that identifies a location of an object (e.g., a dog, person, car, house) in the target image. In situations in which the masking module identifies multiple objects in the target image, one of the multiple objects can be selected in various manners. For example, user input selecting one of the multiple objects can be received, an object can be automatically selected based on the sizes (number of pixels) in the objects, and so forth.

Incorporating an image mask component into the loss function allows the image generation control system to use a loss function that focuses on (is weighted on) a particular object in the target image. The image generation control system will focus on identifying a latent vector and class vector that results in the generative model generating an image that closely approximates the particular object in the target image with less concern for whether the generated image closely approximates other portions of the target image.

Additionally or alternatively, the loss function includes an image transformation component. The generative model can have various biases, such as being biased towards generating objects in the center of the generated image rather than off-centered objects. These biases can reduce the quality of images generated by the generative model. For example, if the generative model is biased towards generating objects in the center of the generated image, then the generated image will be poorer quality (e.g., match the target image less closely) if the object in the target image is an off-centered object than if the object is centered in the target image. The image generation control system can generate transformation information that is incorporated into the loss function, allowing the target image to be transformed to account for bias of the generative model.

After the loss condition is satisfied, the latent and class vectors that resulted in the loss condition being satisfied, also referred to as the final latent and class vectors, are used to fine-tune the generative model. Fine-tuning the generative model refers to adjusting parameters (e.g., weights) of the generative model so that the generative model generates an image from the final latent and class vectors that more closely matches the target image.

The image generation control system fine-tunes the generative model by inputting the latent and class vectors to the generative model, which generates an image from the final latent and class vectors. A loss function is used to compare the target image to the generated image and the parameters (e.g., weights) of the generative model are modified based on the differences between the target image and the generated image. This process is repeated multiple times (with the same final latent and class vectors input to the generative model) until the loss function indicates an acceptable loss between the target image and the generated image (e.g., the loss is less than a threshold amount, the loss has been minimized, etc.).

After fine-tuning the generative model, the final latent and class vectors can also be input to an image editing system. The image editing system receives editing input indicating user requests to edit the generated image (e.g., zoom in or out on an object in the image, move an object in the image to the left or right). The image editing system modifies various aspects of the generative model and provides latent and class vectors (which can be the final latent and class vectors or modified latent and class vectors) to the generative model, resulting in the generative model generating a different generated image edited as requested by the user.

The image editing system can modify different aspects of the generative model using any of a variety of public or proprietary techniques. For example, the image editing system can modify one or both of the final latent and class vectors and provide the modified one or both of the latent and class vectors to the generative model. By way of another example, the image editing system can provide editing controls to the generative model that alter values within the generative model, such as activation values or features between layers of the generative model.

The techniques discussed herein determine a latent vector and a class vector that allow a generative model to generate an image that closely approximates a target image by applying a gradient-free technique to determine the latent vector. This use of a gradient-free technique avoids generating images that do not closely approximate the target image due to local minimums rather than global minimums being identified, which can occur when using gradient-based techniques.

Furthermore, the techniques discussed herein can use an image mask to identify a particular object of interest in the target image. The image mask allows the identifying of a latent vector and a class vector that results in the generative model generating an image that closely approximates the particular object with less concern for whether the generated image closely approximates other portions of the target image. This results in allowing an image to be generated that is focused on the particular object that is of interest (e.g., a dog in the target image) closely approximating the object in the target image.

Additionally, the techniques discussed herein can use a transformation to allow the image being generated to account for bias of the generative model. Accordingly, latent and class vectors can be determined that allow an image to be generated that closely approximates a target image that does not exhibit the bias of the generative model (e.g., generate an image with an object, such as a dog, that is off-centered when the generative model is biased towards generating images with the object centered).

Term Descriptions

These term descriptions are provided for purposes of example only and are not intended to be construed as limiting on the scope of the claims.

The term "generative model" refers to a machine learning system trained to generate images. An example of a generative model is a generative adversarial network (GAN) or the generator network of a GAN.

The term "latent vector" refers to a data input to the generative model from which an image will be generated. Different latent vectors result in different images being generated by the generative model.

The term "class vector" refers to a data input to the generative model that identifies a class or category of image to be generated by the generative model. Examples of classes or categories of images include dogs, cars, landscapes, and so forth.

The term "latent space" refers to the initial inputs to the generative model. These inputs are a latent vector and a class vector.

The term "target image" refers to an image that the generative model is attempting to generate. The target image is an image for which the latent vector and the class vector input to the generative model resulting in the target image are not initially known, but are identified using the techniques discussed herein.

The term "gradient-free technique" refers to techniques (e.g., algorithms) that do not rely on or operate based on gradients (e.g., do not rely on or operate based on gradient descent).

The term "gradient-based technique" refers to techniques (e.g., algorithms) that do rely on or operate based on gradients (e.g., do rely on or operate based on gradient descent).

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the projecting images to a generative model based on gradient-free latent vector determination described herein. The illustrated environment 100 includes a computing device 102, which may be configured in a variety of ways. The computing device 102, for instance, may be configured as a mobile device (e.g., assuming a handheld configuration such as a tablet or mobile phone), a wearable device (e.g., augmented reality or virtual reality headsets, smartwatches), a laptop computer, a desktop computer, a game console, an automotive computer, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 7.

The computing device 102 is illustrated as including a generative model 104 trained to generate images and an image generation control system 106. The computing device 102 also optionally includes an image editing system 108. The generative model 104 can be any of a variety of different types of machine learning systems, such as a generative adversarial network (GAN). It should be noted that a GAN typically contains a generator network and a discriminator network. Once the GAN is trained, the discriminator network is no longer needed. Accordingly, the generative model 104 can be, for example, the generator network of a GAN.

The generative model 104 can be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

The generative model 104 and the image generation control system 106 process and transform digital content 110, which is illustrated as maintained in storage 112 of the computing device 102. Such processing includes generation of a latent vector from the digital content 110, creation of the digital content 110, and rendering of the digital content 110 in a user interface, e.g., by a display device. The storage 112 can be any of a variety of different types of storage, such as random access memory (RAM), Flash memory, solid state drive, magnetic disk drive, and so forth. Although illustrated as implemented locally at the computing device 102, functionality of the generative model 104, the image generation control system 106, or the image editing system 108 may also be implemented in whole or part via functionality available via a network 114, such as part of a web service or "in the cloud."

The image generation control system 106 receives as input a target image 116. The target image 116 can be created in various manners, such as generated by a generative model (e.g., a generative model other than generative model 104), captured by an image capture device (e.g., mobile phone camera), and so forth. The image generation control system 106 projects the target image 116 into the latent space for the generative model 104, resulting in a latent vector that is input to the generative model 104. The generative model 104 generates the generated image 118 from the input latent vector.

Editing input 120 can optionally be received by the image editing system 108 indicating user requests to edit the generated image 118 (e.g., zoom in or out on an object in the image, move an object in the image to the left or right). The image editing system 108 modifies various aspects of the generative model 104 (e.g., the latent vector input to the generative model 104, values in one or more layers of the generative model 104), resulting in the generative model 104 generating a different generated image 118 edited as requested by the user.

It should be noted that although the generative model 104, the image generation control system 106, and the image editing system 108 are each illustrated as standalone systems in FIG. 1, one or more of the generative model 104, the image generation control system 106, and the image editing system 108 can be implemented as part of another program or system. For example, one or more of the generative model 104, the image generation control system 106, and the image editing system 108 can be implemented as part of a digital content editing or creation system, part of an operating system, and so forth.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Image Generation Control System Architecture

Figure 2:
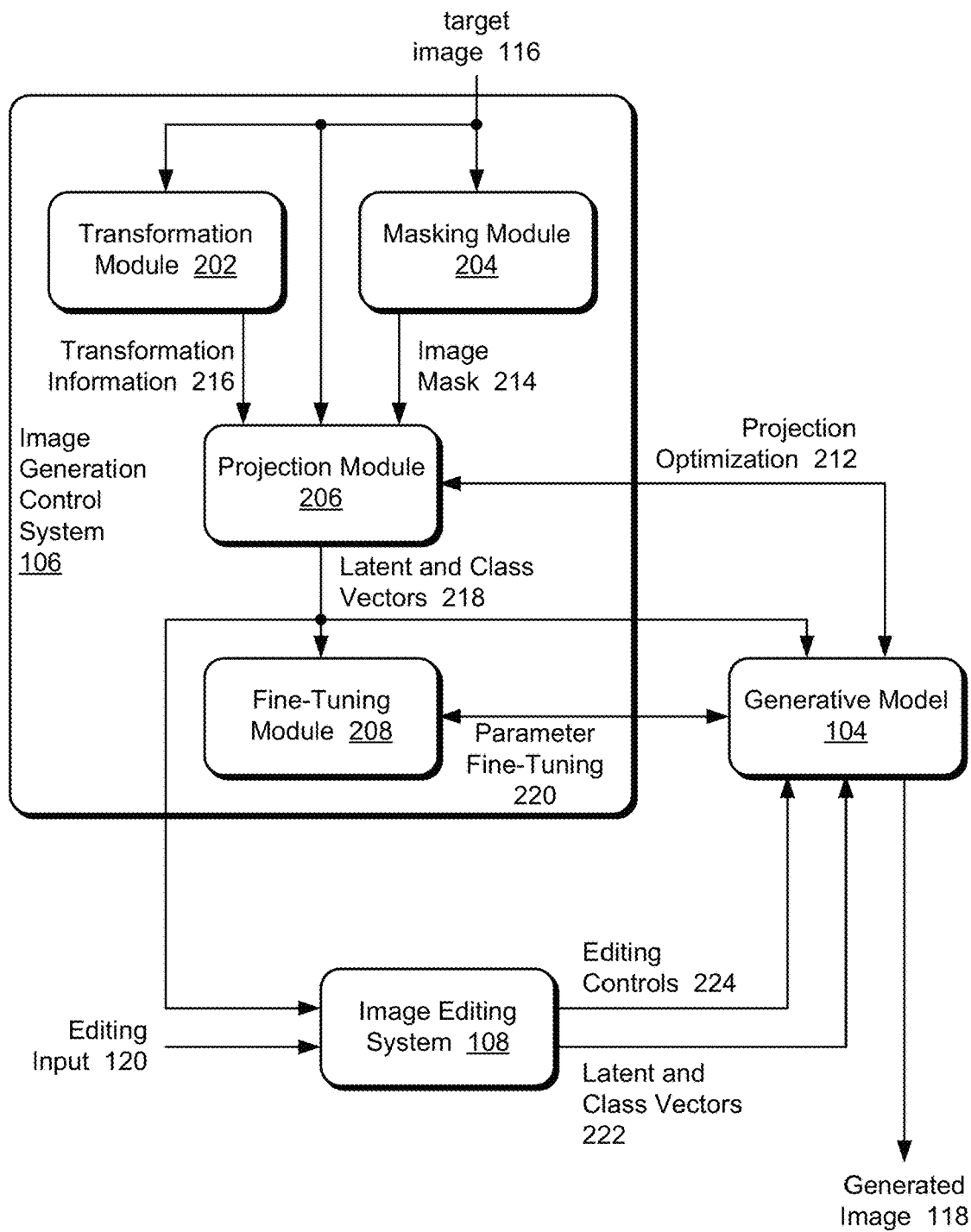
FIG. 2 is an illustration of an example architecture of an image generation control system.

FIG. 2 is an illustration of an example architecture of an image generation control system 106. The image generation control system 106 includes a transformation module 202, a masking module 204, a projection module 206, and a fine-tuning module 208. Generally, the transformation module 202 implements functionality to generate transformation information allowing the target image 116 to be transformed to account for biases in the generative model 104. The masking module 204 implements functionality to identify a location of an object in the target image 116. The projection module 206 implements functionality to project the target image 116 into the latent space of the generative model 104. Projecting the target image 116 into the latent space of the generative model 104 refers to generating a latent vector and a class vector (collectively also referred to as a projection) corresponding to the target image 116 from which the generative model 104 can generate an image that is approximately the same as the target image 116.

The fine-tuning module 208 implements functionality to adjust parameters (e.g., weights) of the generative model 104 allowing the generative model 104 to better generate an image 118 that is approximately the same as the target image 116.

The projection module 206 receives the target image 116 and generates latent and class vectors by using an optimization algorithm to minimize a loss function. The projection module 206 communicates latent and class vectors to the generative model 104 and receives generated images from the generative model 104, illustrated as projection optimization 212. Generally, the projection module 206 generates initial latent and class vectors, such as randomly or pseudorandomly. The initial latent and class vectors are input to the generative model 104, which generates a generated image from the initial latent and class vectors. A loss function is used to compare the target image 116 to the generated image from the generative model 104, and the initial latent and class vectors are modified based on the differences between the target image 116 and the generated image from the generative model 104. The modified latent and class vectors are input to the generative model 104 and this process is repeated multiple times until the loss function indicates an acceptable loss between the target image 116 and the generated image (e.g., the loss is less than a threshold amount, the loss has been minimized, etc.).

In one or more implementations, the generative model 104 is represented as $$y = G(z;c) \quad (1)$$

where G refers to the generative model 104, y refers to an image generated by the generative model 104, z refers to a latent vector, and c refers to a class vector. The latent vectors and class vectors can be various sizes. E.g., the latent vector z can be a 128-dimensional vector and the class vector c can be a one-hot encoding over 1000 classes. The generative model 104 has been trained using any of a variety of public or proprietary techniques to generate the image y.

The projection module 206 determines a latent vector z and a class vector c that, when input to the generative model 104, cause the generative model 104 to generate a generated image 118 that is a close approximate match to the target image 116. The projection module 206 determines the latent vector z and the class vector c by using an optimization process to minimize a loss function $\mathcal{L}(\hat{y}, y)$, where $\hat{y}$ refers to the generated image 118 and y refers to the target image 116. Various different loss functions $\mathcal{L}(\hat{y}, y)$ can be used by the projection module 206 as discussed in more detail below.

In one or more implementations, the projection module 206 determines:

$$\arg\min_{z,c} \mathcal{L}(G(z, c), y) \quad (2)$$

such that $C(z) \leq C_{max}$, where G(z,c) refers to the generated image 118 from the generative model 104 based on the latent vector z and the class vector c, C(z) is a value sampled from a multivariate Gaussian, and z is a value sampled from the multivariate Gaussian. The projection module 206 constrains the values sampled from the multivariate Gaussian to be close to the origin. For example, $C_{max}=2$ and the sample value is truncated to have an absolute value of 2, so the sampled value ranges from −2 to 2 a maximum value of −2 if negative, and otherwise a maximum value of 2.

The projection module 206 uses a combination of gradient-free and gradient-based techniques to find a latent vector z and class vector c that result in a generated image 118 that is an approximate match to the target image 116 (also referred to as inverting the generative model 104). Gradient-based techniques rely on gradients whereas gradient-free techniques do not rely on gradients. Gradient-based techniques take advantage of gradient information that can allow them to find an approximate match quicker than gradient-free techniques, but gradient-based techniques oftentimes identify local minimums rather than global minimums so identify a closest approximate match to the target image 116 less accurately than the gradient-free techniques. By using a combination of gradient-free and gradient-based techniques, the projection module 206 leverages the faster performance of the gradient-based techniques as well as the more accurate performance of the gradient-free techniques.

The projection module 206 uses a combination of a gradient-free technique and a gradient-based technique, such as by alternating between the two techniques during consecutive iterations, performing both techniques in each iteration, and so forth. In one or more implementations, a gradient-free technique is used to find the latent vector z and a gradient-based technique is used to find the class vector c. Additionally or alternatively, the gradient-free and gradient-based techniques can be used in different manners, such as using the gradient-free technique to find the latent vector z and a gradient-based technique to find the class vector c. The projection module 206 uses a gradient-free technique and a gradient-based technique regardless of which loss function is used by the projection module 206 to determine the loss between the target image 116 and a generated image 118.

For the gradient-free technique, the projection module 206 maintains a Gaussian distribution (μ, Σ) in parameter space z with mean μ and covariance matric Σ. At each iteration, the projection module 206 generates N samples (multiple samples, such as N=10) of $z_i$ from the Gaussian. The projection module 206 determines the loss between the target image 116 and the image generated from each of the latent-class vector pairs $(z,c)_i$ and performs a Covariance Matrix Adaptation (CMA) update using the optimized z vector having the lowest loss (the lowest value of the loss function), resulting in a new multivariate Gaussian (μ, Σ).

For the gradient-based technique, the projection module 206 refines each of the N samples by concatenating the sample with an initially predicted class vector $c_0$ (in the initial iteration) and with an updated class vector $c_{i-1}$ (in subsequent iterations), resulting in latent-class vector pairs $(z,c)_i$. The projection module 206 then optimizes the latent-class vector pairs $(z,c)_i$ using a gradient-based optimizer, such as a number (e.g., 50) of optimization steps using an Adam optimizer or L-BFGS (Limited-memory Broyden-Fletcher-Goldfarb-Shanno) optimization algorithm.

The projection module 206 performs multiple iterations of determining a latent vector z and a class vector c until a latent vector z and a class vector c are determined that result in the loss between the target image 116 and the image generated from each of the latent-class vector pairs (z,c) satisfying a loss condition. A loss condition refers to a condition that when satisfied indicates an acceptable loss, and that when not satisfied indicates an unacceptable loss. The loss condition can be implemented in a variety of different manners as discussed below. The latent vector z and the class vector c that result in the loss between the target image 116 and the image generated from each of the latent-class vector pairs (z,c) satisfying the loss condition are also referred to as the final latent vector z and the final class vector c.

The loss condition, and whether the loss condition is satisfied, can be implemented in a variety of different manners. In one or more implementations, the projection module 206 determines that the loss condition is satisfied in response to the determined loss for iterations beginning to increase (e.g., the loss increases over a threshold number of iterations, such as 3 consecutive iterations). The value of this threshold number of iterations can be selected (e.g., preset) by the developer or designer of the image generation control system 106, selected (e.g., via configuration settings) by the user of the image generation control system 106, and so forth so as to prevent the image generation control system 106 from continuing to determine latent-class vector pairs with resulting in greater losses.

Additionally or alternatively, the projection module 206 determines that the loss condition is satisfied in response to the loss satisfying a threshold amount (e.g., 4%). The value of this threshold number of amount can be selected (e.g., preset) by the developer or designer of the image generation control system 106, selected (e.g., via configuration settings) by the user of the image generation control system 106, and so forth so as to prevent the image generation control system 106 from continuing to determine latent-class vector pairs with resulting in greater losses.

Additional information regarding CMA can be found in "Completely derandomized self-adaptation in evolution strategies" by Nikolaus Hansen and Andreas Ostermeier, Evolutionary Computation, pages 159-195 (2001), which is hereby incorporated by reference herein in its entirety. Additional information regarding performing iterations using alternating gradient-free and gradient-based techniques, (e.g., referred to as basin-CMA) can be found in "Optimal gait and form for animal locomotion," by Kevin Wampler and Zoran Popović, ACM Transactions on Graphics (2009), which is hereby incorporated by reference herein in its entirety.

It should be noted that inverting many generative models in a manner that reliably finds good solutions is challenging due to the large number of layers. By using the combination of gradient-free and gradient-based techniques discussed herein, the projection module 206 performs such inverting and finds good solutions even on generative models with large numbers of layers.

As mentioned above, various different loss functions $\mathcal{L}(\hat{y}, y)$ can be used by the projection module 206. In one or more implementations, the projection module 206 uses the following loss function:

$$\mathcal{L}(y, \hat{y}) = \frac{1}{H \times W} \|\hat{y} - y\|_1 + \beta \mathcal{L}_{per}(\hat{y}, y) \qquad (3)$$

where H refers to the height (e.g., in pixels) of the target image 116 (and the generated image 118), W refers to the width (e.g., in pixels) of the target image 116 (and the generated image 118), $\hat{y}$ refers to the generated image 118, y refers to the target image 116, β refers to a weighting constant, and $\mathcal{L}_{per}$ is a perceptual loss that models the perceptual closeness of the images perceived by humans. The first part of the loss function, $$\frac{1}{H \times W} \|\hat{y} - y\|_1,$$

refers to the reconstruction loss between the images.

The $\mathcal{L}_{per}$ loss uses a pre-trained model calibrated on human perceptual judgments. The value β indicates how heavily the loss $\mathcal{L}_{per}$ is to factor into the loss $\mathcal{L}(y, \hat{y})$ relative to the reconstruction loss. In one or more implementations, β=10. Any of a variety of different losses that model the perceptual closeness of images perceived by humans can be used as $\mathcal{L}_{per}$, such as Learned Perceptual Image Patch Similarity (LPIPS). Additional information regarding the LPIPS loss can be found in "The unreasonable effectiveness of deep networks as a perceptual metric" by Richard Zhang, Phillip Isola, Alexei A Efros, Eli Shechtman, and Oliver Wang, IEEE Conference on Computer Vision and Pattern Recognition (2018), which is hereby incorporated by reference herein in its entirety.

In one or more implementations, the projection module 206 also receives from the masking module 204 an image mask 214 that identifies a location of an object in the target image 116. The masking module 204 identifies one or more objects in the target image 116 using any of a variety of different object detection techniques, such as the Mask R-CNN detection method as described in "Mask R-CNN" by Kaiming He, Georgia Gkioxari, Piotr Dollár, and Ross Girshick, Proceedings of the IEEE international conference on computer vision, pages 2961-2969 (2017). In situations in which the masking module 204 identifies multiple objects in the target image 116, one of the multiple objects can be selected in various manners. For example, user input selecting one of the multiple objects can be received via a touchscreen input, menu selection, voice input, and so forth. By way of another example, one of the multiple objects can be selected automatically by the masking module 204, such as selection of the largest object (e.g., the object including the largest number of pixels).

Image mask 214 allows the projection module 206 to use a loss function that focuses on (is weighted on) a particular object in the target image 116. This allows, for example, situations in which a user desires to focus on a particular object in the target image 116 (e.g., a dog or car) rather than other portions of the target image 116 (e.g., the background). The projection module 206 will focus on identifying a latent vector and class vector that results in the generative model 104 generating the generated image 118 that closely approximates the particular object in target image 116 with less concern for whether the generated image 118 closely approximates other portions of the target image 116. Furthermore, in some situations the generative model 104 is designed to generate a single object (e.g., a dog or car). By focusing on the particular object in the target image 116 the projection module 206 accounts for this single-object focus on the generative model 104.

In one or more implementations, the masking module 204 generates a mask $m \in [0,1]^{H \times W \times 1}$, where H refers to the height (e.g., in pixels) of the target image 116 (and the generated image 118) and W refers to the width (e.g., in pixels) of the target image 116 (and the generated image 118). The foreground areas (the portion that include the object) are set to 1 and the background areas (the portion that does not include the object) is set to τ. Adding some weight to the background helps constrain the object in the generated image 118. Accordingly, a non-zero value can be used for τ, such as 0.3.

To take into account the image mask 214, the projection module 206 uses a loss function that is similar to loss function (3) discussed above, but incorporates the image mask 214. In one or more implementations, the projection module 206 uses the following loss function:

$$\mathcal{L}_m(y, \hat{y}) = \frac{1}{\|m\|_1} \|m \odot (\hat{y} - y)\|_1 + \beta \mathcal{L}_{per}(\hat{y}, y, m) \quad (4)$$

where m refers to the image mask 214, and the Hadamard product ⊙ represents element-wise multiplication across the spatial dimensions. The projection module 206 calculates the perceptual loss $\mathcal{L}_{per}(\hat{y}, y, m)$ by bilinearly downsampling the mask m at the resolution of the intermediate spatial feature maps within the perceptual loss.

In one or more implementations, the projection module 206 also receives from the transformation module 202 transformation information 216 that is information allowing the target image 116 to be transformed to account for bias of the generative model 104. For example, the generative model 104 may be biased towards generating objects in the center of the generated image 118 rather than off-centered objects. The generative model 104 may exhibit biases for multiple reasons. For example, the generative model 104 may exhibit a bias as a result of biases in the data set used to train the generative model. By way of another example, the generative model 104 is trained to mimic the training distribution of the training dataset but may not reproduce the full distribution and instead accentuate biases in the training dataset. These biases can reduce the quality of images generated by the generative model 104. For example, if the generative model 104 is biased towards generating objects in the center of the generated image 118, then the generated image 118 will be poorer quality (e.g., match the target image 116 less closely) if the object (e.g., a dog) in the target image 116 is off-centered object (e.g., a dog) than if the object is centered in the target image 116.

The projection module 206 generates a transformation information 216 that indicates the bias of the generative model 104. The bias of the generative model 104 can be determined directly by the projection module 206 or alternatively can be determined by another device or system and provided to the projection module 206. To determine the bias of the generative model 104, multiple images (e.g., on the order of 10,000 or 100,000) are generated by the generative model 104. The one or more characteristics of the generated image are analyzed and various statistics regarding each of the one or more characteristics is determined as the transformation information 216. Examples of the transformation information 216 include the mode of the characteristic, the average of the characteristic, the length of the characteristic, and so forth. The statistics can be global (e.g., for all pixels in the image) or localized (e.g., for pixels in an object mask generated using any of a variety of different object detection techniques, such as the Mask R-CNN detection method). These characteristics can include, for example, the center of mass of objects in the generated images (as indicated by an object mask), the height and width of objects in the generated images (as indicated by an object mask), color and saturation of the images, color and saturation of objects in the generated images (as indicated by the object mask), shape of objects in the generated images (as indicated by the object mask), and so forth.

Figure 3:
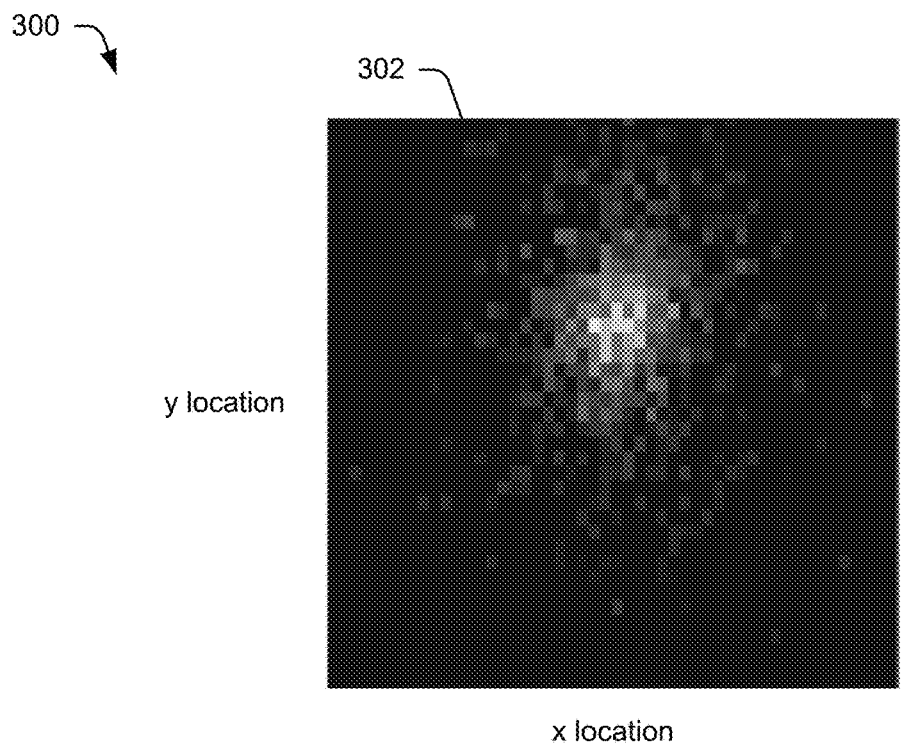
FIG. 3 illustrates an example of bias in the generative model.
Figure 3:
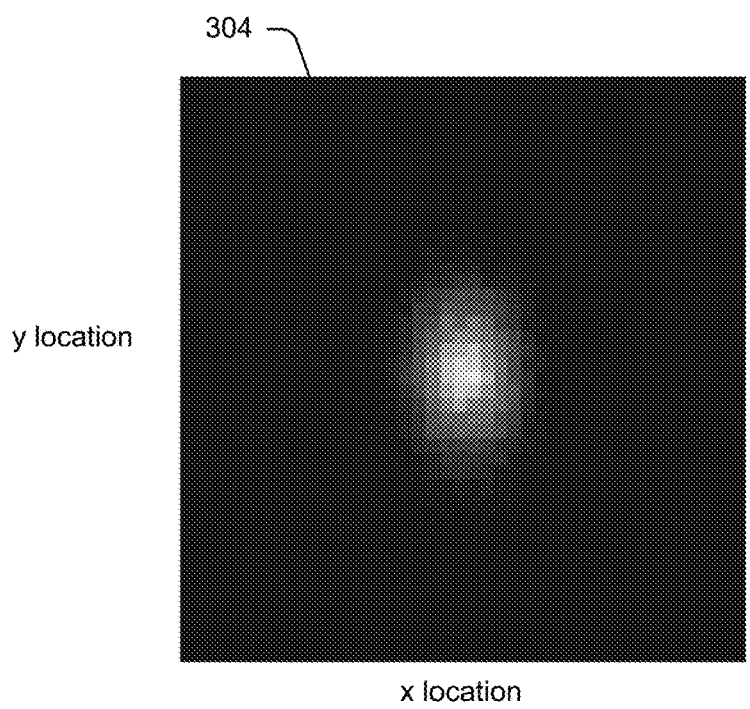

FIG. 3 illustrates an example 300 of bias in the generative model 104. The center of mass of objects in images from an image database (e.g., ImageNet) is illustrated in a histogram 302. Locations in the histogram correspond to x and y locations of images from the image database. Brighter locations in the histogram 302 correspond to larger numbers of objects in images from the image database that have a center of mass at the location, and darker locations in the histogram 302 correspond to smaller numbers of objects in the images from image database that have a center of mass at the location.

The center of mass of objects in images generated by the generative model 104 is illustrated in a histogram 304. Locations in the histogram correspond to x and y locations of images in the training dataset. Brighter locations in the histogram 304 correspond to larger numbers of objects in the generated images that have a center of mass at the location, and darker locations in the histogram 302 correspond to smaller numbers of objects in the generated images that have a center of mass at the location. As can be seen from histograms 302 and 304, the generative model 104 is biased to generate images with objects more centered than is found in the images from the image database.

Figure 4:
FIG. 4 illustrates another example of bias in the generative model.
Figure 4:
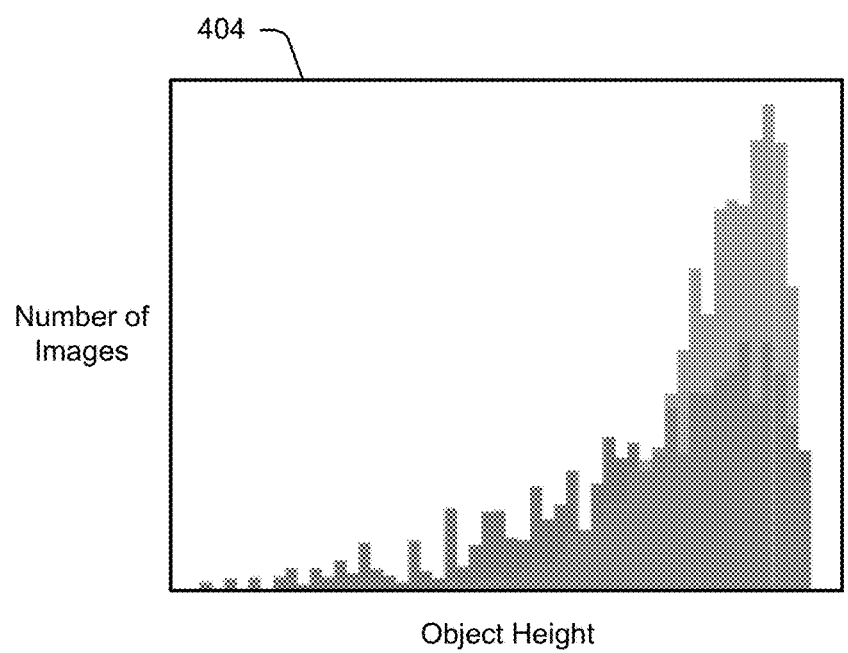

FIG. 4 illustrates another example 400 of bias in the generative model 104. The width of objects in images from an image database (e.g., ImageNet) is illustrated in a histogram 402. Object width is illustrated along the x axis of the histogram 402 and the number of images is illustrated along the y axis of the histogram 402. Lighter shading in the histogram 402 corresponds to objects in images from the image database and darker shading in the histogram 402 corresponds to objects in the images generated by the generative model 104. As can be seen from the histogram 402, the generative model 104 is biased to generate images closer to the width distribution mode than is found in images from the image database.

The height of objects in images from an image database (e.g., ImageNet) is illustrated in a histogram 404. Object height is illustrated along the x axis of the histogram 404 and the number of images is illustrated along they axis of the histogram 404. Lighter shading in the histogram 404 corresponds to objects in images from the image database and darker shading in the histogram 404 corresponds to objects in the images generated by the generative model 104. As can be seen from the histogram 404, the generative model 104 is biased to generate images closer to the height distribution mode than is found in images from the image database.

Returning to FIG. 2, to account for biases in the generative model 104, in one or more implementations the projection module 206 determines:

$$\arg\min_{z,t,c} \mathcal{L}_m(G(z, c), \Phi(y, t)) \quad (5)$$

such that $C(z) \leq C_{max}$, where $G(z,c)$ refers to the generated image 118 from the generative model 104 based on the latent vector z and the class vector c, $\Phi(y,t)$ is an image transformation that resamples the image y according to the parameters t, $C(z)$ is a value sampled from a multivariate Gaussian, and z is a value sampled from the multivariate Gaussian. Any of a variety of public or proprietary techniques can be used to resample the image y according to the parameters t. This resampling of the image y allows, for example, an off-centered object in the image y to be centered to account for the bias of the generative model 104. The projection module 206 constrains the values sampled from the multivariate Gaussian to be close to the origin. For example, $C_{max}=2$ and the sample value is truncated to have an absolute value of 2, so the sampled value ranges from −2 to 2 a maximum value of −2 if negative, and otherwise a maximum value of 2.

The projection module 206 uses, for example scale and translation parameters $t=[s_x, s_y, t_x, t_y]$, where $s_x$ refers to scale in the x dimension (width), $s_y$ refers to scale in the y dimension (height), $t_x$ refers to translation (position) in the x dimension, and $t_y$ refers to translation (position) in they dimension. Although examples are discussed with reference to scale and translation of the object generated by the generative model 104, it is to be appreciated that transformation to account for other biases (e.g., color) can be analogously performed by the projection module 206.

Transformation information 216 allows the projection module 206 to use a loss function that accounts for bias in the generative model 104. Each of the loss functions discussed above can be updated to replace y with $\Phi(y,t)$. Accordingly, a loss function analogous to loss function (4) that accounts for bias in the generative model 104 would be:

$$\mathcal{L}_m(\Phi(y, t), \hat{y}) = \frac{1}{\|m\|_1}\|m \odot (\hat{y} - \Phi(y, t))\|_1 + \beta \mathcal{L}_{per}(\hat{y}, \Phi(y, t), m) \quad (6)$$

In one or more implementations, projection module 206 initializes the translation parameters $s_x$, $s_y$, $t_x$, $t_y$ for the first iteration as follows. The translation $t_y$ is initialized as $$\frac{h^c - h_m^c}{h},$$

the translation $t_x$ is initialized as $$\frac{w^c - w_m^c}{w},$$

the translation $s_y$ is initialized as min $$\left(\frac{h_m}{h}\right),$$

and the translation $s_x$ is initialized as min $$\left(\frac{w_m}{w}\right),$$

where $(h^c, w^c)$ is the center of mass computed from the mode of the generated shapes $(h_m^c, w_m^c)$ indicated in the transformation information 216, (h,w) are the dimensions of the masked region of the target image 116, and $(h_m, w_m)$ are the modes of the generated shapes $(h_m^c, w_m^c)$ indicated in the transformation information 216. These same translation parameters $s_x$, $s_y$, $t_x$, $t_y$ are also used for each iteration (e.g., although the latent vector z and the class vector c are updated in each iteration, the translation parameters need not be updated in each iteration).

After the loss condition is satisfied, the projection module 206 provides the latent and class vectors 218 to the fine-tuning module 208. These latent and class vectors 218 are also referred to as the final latent vector and the final class vector. The fine-tuning module 208 receives the latent and class vectors 218 implements functionality to adjust parameters (e.g., weights) of the generative model 104, illustrated as parameter fine-tuning 220. This adjusting the parameters of the generative model 104 allows the generative model 104 to better generate an image 118 that is approximately the same as the target image 116.

The latent and class vectors 218 are input to the generative model 104, which generates a generated image from the latent and class vectors 218. A loss function is used to compare the target image 116 to the generated image from the generative model 104, and the parameters (e.g., weights) of the generative model 104 are modified based on the differences between the target image 116 and the generated image from the generative model 104. This process is repeated multiple times (with the same latent and class vectors 218) until a loss condition is satisfied (e.g., the loss function indicates an acceptable loss between the target image 116 and the generated image, such as the loss is less than a threshold amount, the loss has been minimized, etc.).

In one or more implementations, the fine-tuning module 208 uses the following loss function:

$$\arg\min_{z,t,c,\theta} L_m(G_\theta(z, c), \Phi(y, t)) + \gamma\|\theta - \theta_0\|_2 \quad (7)$$

such that $C(z) \leq C_{max}$, where $G_\theta(z,c)$ refers to the generated image 118 from the generative model 104 with weights θ based on the latent vector z and the class vector c, $\theta_0$ are the original weights of the generative model 104 (prior to the fine-tuning module 208 adjusting the weights), $\Phi(y,t)$ is an image transformation that resamples the image y according to the parameters t, γ refers to a weighting constant, $C(z)$ is a value sampled from a multivariate Gaussian, and z is a value sampled from the multivariate Gaussian. The projection module 206 constrains the values sampled from the multivariate Gaussian to be close to the origin. For example, $C_{max}=2$ and the sample value is truncated to have an absolute value of 2, so the sampled value ranges from −2 to 2 a maximum value of −2 if negative, and otherwise a maximum value of 2. L2-regularization on the weights is used in the loss function (7) so that the fine-tuned weights θ do not deviate too much from the original weights $\theta_0$. The value γ indicates how heavily the L2-regularization is to factor into the loss, and in one or more implementations, $\gamma=10^7$. Additionally or alternatively, regularization can be performed in other manners, such as by using elastic weight consolidation as discussed in "Overcoming catastrophic forgetting in neural networks" by Kirkpatrick, P. et al., PNAS (2017). In one or more implementations, the fine-tuning module 208 optimizes the weights θ using a gradient-based optimizer, such as a number (e.g., 50) of optimization steps using an Adam optimizer.

In one or more implementations, the projection module 206 implements a compositional approach in which multiple objects within the target image 116 are identified. For each of the multiple objects, a final latent vector and final class vector are generated as discussed above. The fine-tuning module 208 can fine-tune the parameters of the generative model 104 using the final latent vector and final class vector for one or more of the multiple objects.

The generative model 104 creates a generated image 118 for each of these final latent vector and final class vector pairs, and an additional module or system (e.g., the projection module 206 or the image editing system 108) composites the multiple generated images. The multiple generated images can be composited in various manners, such as using alpha blending. For each of the multiple objects in the target image 116, the object is identified in the generated image and alpha blended with one more of the other multiple generated images with that object having a higher opacity than corresponding portions of the other of the multiple images. This results in a final generated image with each of the multiple objects identified in the target image 116.

The latent and class vectors 218 are also input to the image editing system 108. Editing input 120 is received by the image editing system 108 indicating user requests to edit the generated image 118 (e.g., zoom in or out on an object in the image, move an object in the image to the left or right). The image editing system 108 modifies various aspects of the generative model 104 and provides latent and class vectors 222 (which can be latent and class vectors 218) to the generative model 104, resulting in the generative model 104 generating a different generated image 118 edited as requested by the user.

The image editing system 108 can modify different aspects of the generative model 104 using any of a variety of public or proprietary techniques. For example, the image editing system 108 can alter the one or both of the latent and class vectors 218 and provide the altered one or both of the latent and class vectors to the generative model 104 as latent and class vectors 222. By way of another example, the image editing system 108 can provide editing controls 224 to the generative model 104 that alter values within the generative model 104, such as activation values or features between layers of the generative model 104.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-4.

Figure 5:
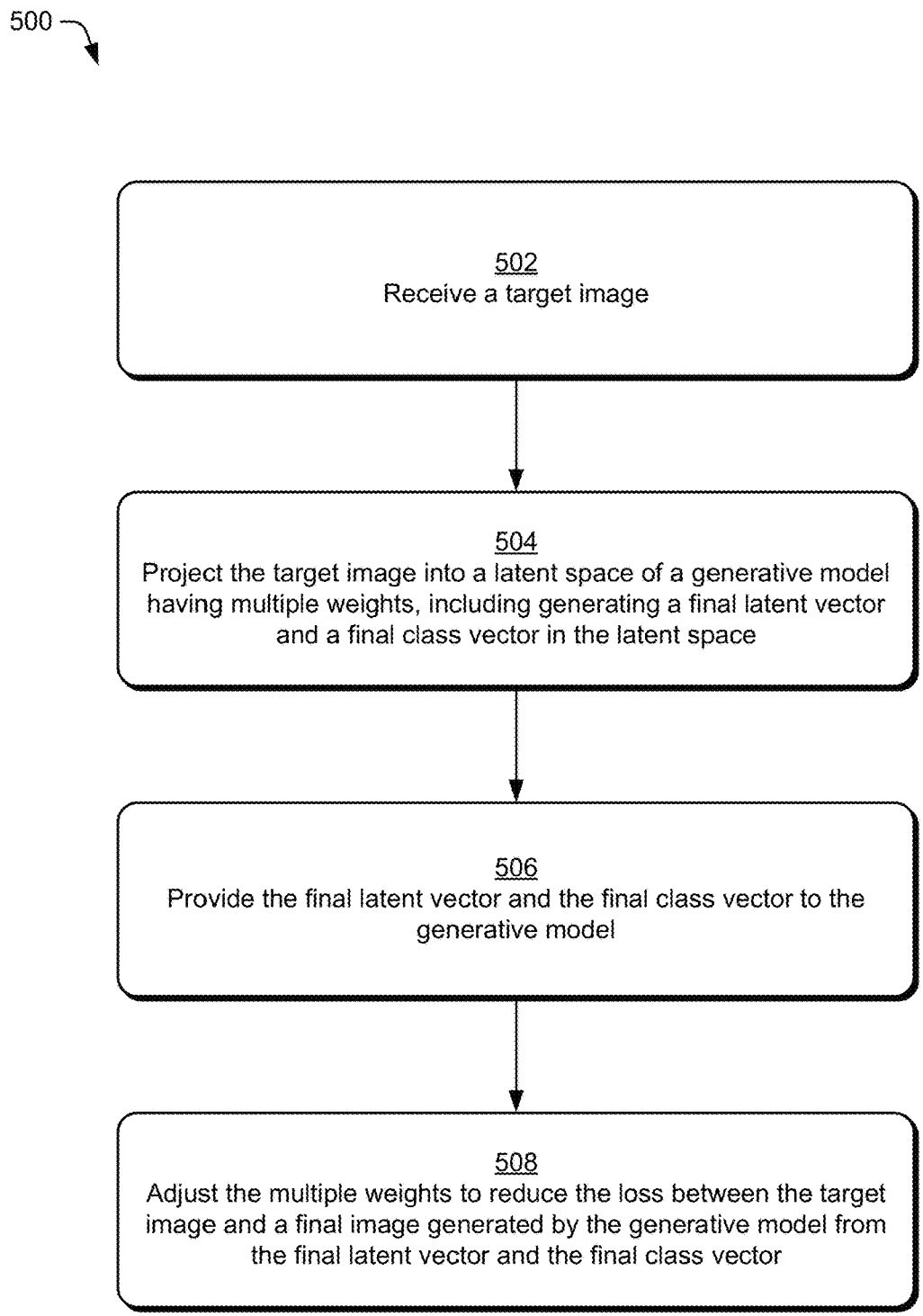
FIG. 5 is a flow diagram depicting a procedure in an example implementation of projecting images to a generative model based on gradient-free latent vector determination.

FIG. 5 is a flow diagram 500 depicting a procedure in an example implementation of projecting images to a generative model based on gradient-free latent vector determination. In this example, a target image is received (block 502). The target image is, for example, a digital image that a user requests be edited by a generative model.

The target image is projected into a latent space of a generative model having multiple weights (block 504). The generative model is, for example, a generative neural network such as at least the generator portion of a GAN. The projecting includes generating a final latent vector and a final class vector in the latent space.

The final latent vector and the final class vector are provided to the generative model (block 506). Additionally, the multiple weights of the generative model are adjusted to reduce the loss between the target image and a final image generated by the generative model from the final latent vector and the final class vector (block 508). This adjusting of the multiple weights of the generative model is also referred to as fine-tuning the generative model.

Figure 6:
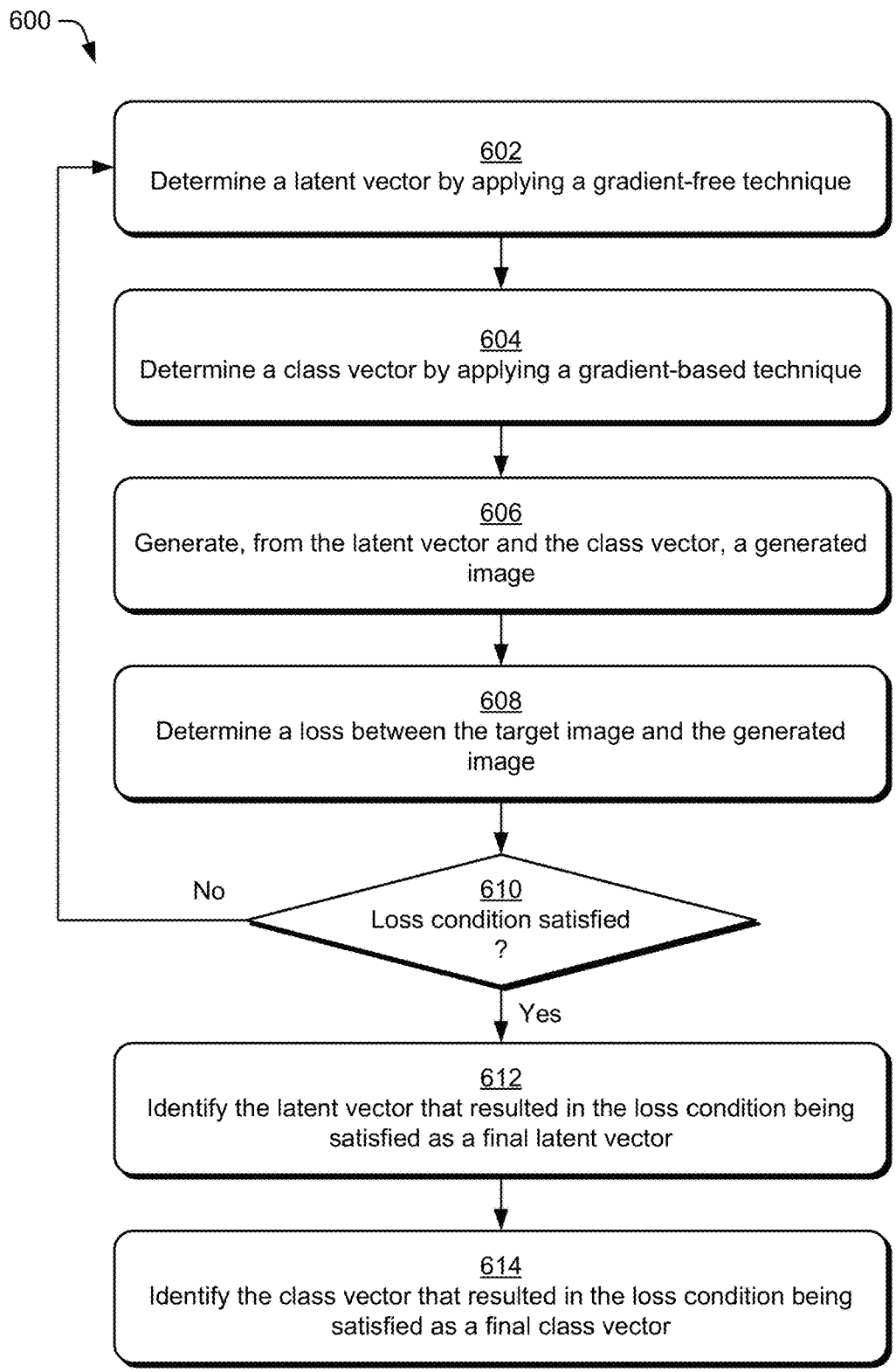
FIG. 6 is a flow diagram depicting another procedure in an example implementation of projecting images to a generative model based on gradient-free latent vector determination.

FIG. 6 is a flow diagram 600 depicting a procedure in an example implementation of projecting images to a generative model based on gradient-free latent vector determination. The flow diagram 600 can perform, for example, the projecting a target image into a latent space of a generative model of block 504 of FIG. 5. In this example, a latent vector is determined by applying a gradient-free technique (block 602). This gradient-free technique is implemented by performing a CMA update based on a loss between the target image and a previously generated image generated by the generative model.

A class vector is determined by applying a gradient-based technique (block 604). This gradient-based technique is implemented by using a gradient-based optimizer based on the loss between the target image and a previously generated image generated by the generative model.

A new image is generated from the latent vector and the class vector (block 606). These are the latent vector determined in block 602 and the class vector determined in block 604.

The loss between the target image and the newly generated image is determined (block 608). This determination is based on a loss function that optionally incorporates an object mask that identifies one or more objects in the target image to focus the loss function on those one or more objects.

A check is then made as to whether a loss condition is satisfied (block 610). The loss condition indicates an acceptable loss between the target image and the newly generated image, and can be implemented in a variety of different manners. For example, the loss condition can be that the loss has increased since one or more previous losses were determined, that the loss satisfies a threshold amount, and so forth.

If the loss condition is not satisfied, the procedure returns to block 602 to generate a new latent vector based on the newly determined loss.

However, if the loss condition is satisfied, then the latent vector that resulted in the loss condition being satisfied is identified as a final latent vector (block 612). Additionally, the class vector that resulted in the loss condition being satisfied is identified as a final class vector (block 614). The final latent vector and the final class vector can be provided to the generative model in order to fine-tune the generative model as discussed above.

Example System and Device

Figure 7:
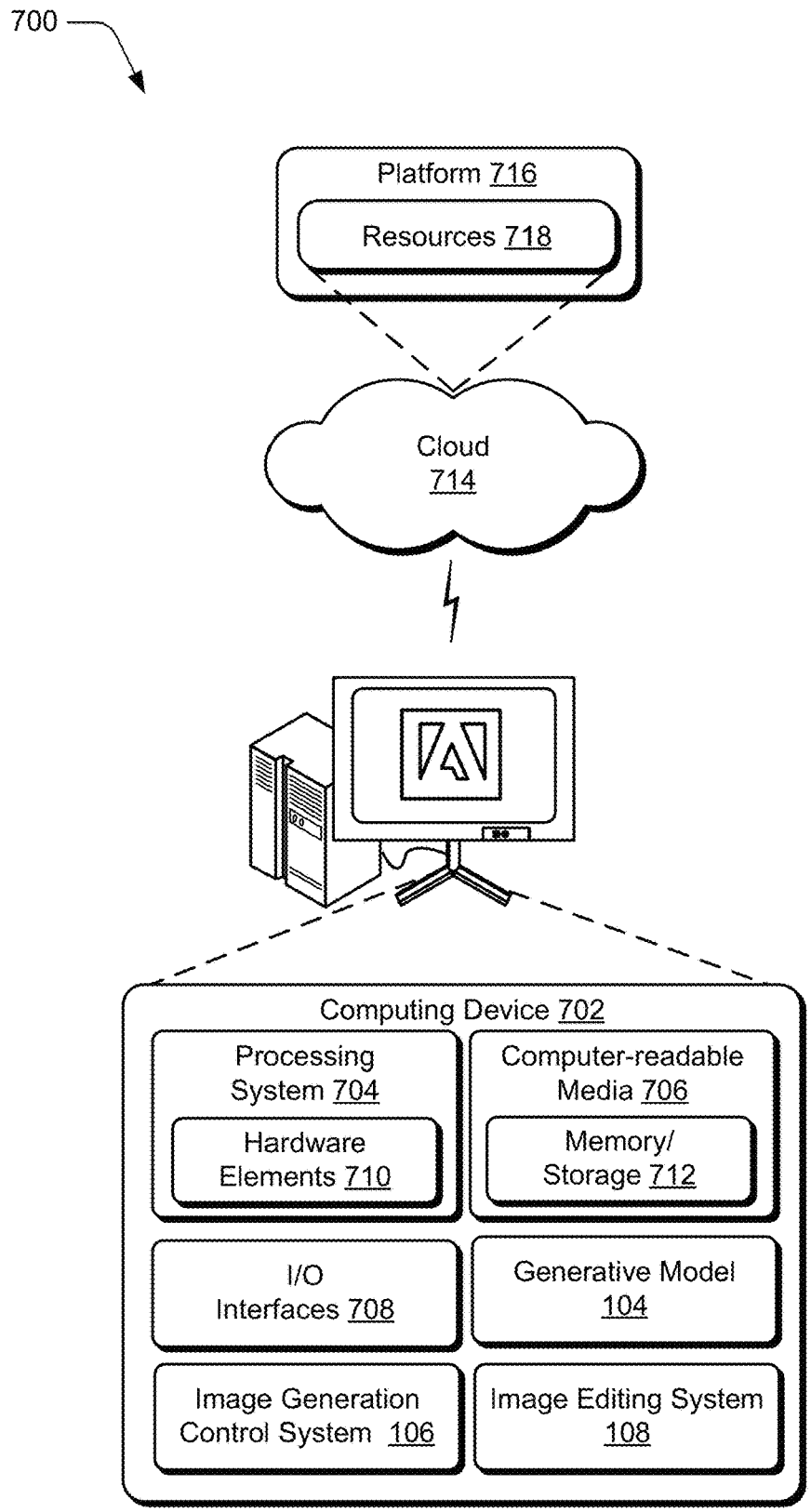
FIG. 7 illustrates an example system including various components of an example device that can be implemented as any type of computing device as described and/or utilized with reference to FIGS. 1-6 to implement aspects of the techniques described herein.

FIG. 7 illustrates an example system generally at 700 that includes an example computing device 702 that is representative of one or more computing systems and/or devices that may implement the various techniques described herein. This is illustrated through inclusion of the generative model 104, the image generation control system 106, and the image editing system 108. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as RAM) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a content creation digital medium environment, a computing device comprising:
a processor; and
computer-readable storage media having stored thereon multiple instructions of an application that, responsive to execution by the processor, cause the processor to perform operations including:
receiving a target image;
identifying a first latent vector and a first class vector that result in a first image generated by a generative model by:
determining a second latent vector by applying a previously determined loss between the target image and a previously generated image to a gradient-free technique;
determining a second class vector by applying the previously determined loss to a gradient-based technique;
generating, from the second latent vector and the second class vector, a second image;
determining a loss between the target image and the second image;
repeating the determining the second latent vector, the determining the second class vector, the generating, and the determining the loss until a loss condition is satisfied;
identifying the second latent vector that resulted in the loss condition being satisfied as the first latent vector;
identifying the second class vector that resulted in the loss condition being satisfied as the first class vector;
providing the first latent vector and the first class vector to the generative model, the generative model including multiple weights; and
adjusting the multiple weights to reduce the loss between the target image and a first image.

2. The computing device of claim 1, further comprising determining the loss between the target image and the second image based on a reconstruction loss and a perceptual loss that models perceptual closeness of images perceived by humans.

3. The computing device of claim 1, the operations further including generating an image mask that identifies an object in the target image, and the determining the loss further comprising weighting a loss function on the object.

4. The computing device of claim 1, the operations further including receiving transformation information that indicates a bias of the generative model and incorporating the transformation information into the determining the loss between the target image and the second image.

5. The computing device of claim 4, the transformation information comprising a mode of a height of objects in multiple images generated by the generative model, a mode of a width of the objects in the multiple images, and a mode of a center of mass of the objects in the multiple images.

6. The computing device of claim 4, the operations further including generating an image mask that identifies an object in the target image, and the determining the loss further comprising weighting a loss function on the object.

7. The computing device of claim 1, the adjusting the multiple weights comprising:
   generating, from the first latent vector and the first class vector, a third image;
   determining an additional loss between the target image and the third image;
   adjusting the multiple weights to reduce the loss between the target image and the third image; and
   repeating the generating the third image, the determining the additional loss, and the adjusting until an additional loss condition is satisfied.

8. The computing device of claim 1, the operations further including receiving user input requesting editing of a third image generated by the generative model, modifying an aspect of the generative model to obtain the editing requested by the user input, and generating a fourth image by providing a new latent vector and a new class vector to the modified generative model.

9. A system comprising:
   a generative model having multiple weights and configured to generate an image;
   means for identifying a first latent vector by applying a gradient-free technique and identifying a first class vector by applying a gradient-based technique that result in a first image generated by the generative model; and
   means for adjusting the multiple weights to reduce a loss between a target image and the image generated by the generative model from the first latent vector and the first class vector.

10. The system of claim 9, the means for identifying a first latent vector further including means for generating an image mask that identifies an object in the target image and means for determining the loss by weighting a loss function on the object.

11. The system of claim 9, the means for identifying a first latent vector further including means for receiving transformation information that indicates a bias of the generative model and means for determining the loss by incorporating the transformation information into a loss function.

12. The system of claim 11, the transformation information comprising a mode of a height of objects in multiple images generated by the generative model, a mode of a width of the objects in the multiple images, and a mode of a center of mass of the objects in the multiple images.

13. In a digital content creation digital medium environment, a method implemented by at least one computing device, the method comprising:
   receiving a target image;
   identifying a first latent vector and a first class vector that result in a first image generated by a generative model by:
      determining a second latent vector by applying a previously determined loss between the target image and a previously generated image to a gradient-free technique;
      determining a second class vector by applying the previously determined loss to a gradient-based technique;
      generating, from the second latent vector and the second class vector, a second image;
      determining a loss between the target image and the second image;
      repeating the determining the second latent vector, the determining the second class vector, the generating, and the determining the loss until a loss condition is satisfied;
      identifying the second latent vector that resulted in the loss condition being satisfied as the first latent vector;
      identifying the second class vector that resulted in the loss condition being satisfied as the first class vector;
   providing the first latent vector and the first class vector to the generative model, the generative model including multiple weights; and
   adjusting the multiple weights to reduce the loss between the target image and a first image.

14. The method of claim 13, further comprising determining the loss between the target image and the second image based on a reconstruction loss and a perceptual loss that models perceptual closeness of images perceived by humans.

15. The method of claim 13, further comprising generating an image mask that identifies an object in the target image, and the determining the loss further comprising weighting a loss function on the object.

16. The method of claim 13, further comprising receiving transformation information that indicates a bias of the generative model and incorporating the transformation information into the determining the loss between the target image and the second image.

17. The method of claim 16, the transformation information comprising a mode of a height of objects in multiple images generated by the generative model, a mode of a width of the objects in the multiple images, and a mode of a center of mass of the objects in the multiple images.

18. The method of claim 16, further comprising generating an image mask that identifies an object in the target image, and the determining the loss further comprising weighting a loss function on the object.

19. The method of claim 13, the adjusting the multiple weights comprising:
   generating, from the first latent vector and the first class vector, a third image;
   determining an additional loss between the target image and the third image;
   adjusting the multiple weights to reduce the loss between the target image and the third image; and
   repeating the generating the third image, the determining the additional loss, and the adjusting until an additional loss condition is satisfied.

20. The method of claim 13, further comprising receiving user input requesting editing of a third image generated by the generative model, modifying an aspect of the generative model to obtain the editing requested by the user input, and generating a fourth image by providing a new latent vector and a new class vector to the modified generative model.

* * * * *